Nov. 5, 1929.                E. A. BANSCHBACH                1,734,758
                         PROTECTOR FOR AUTOMOBILES
                         Original Filed April 22, 1922
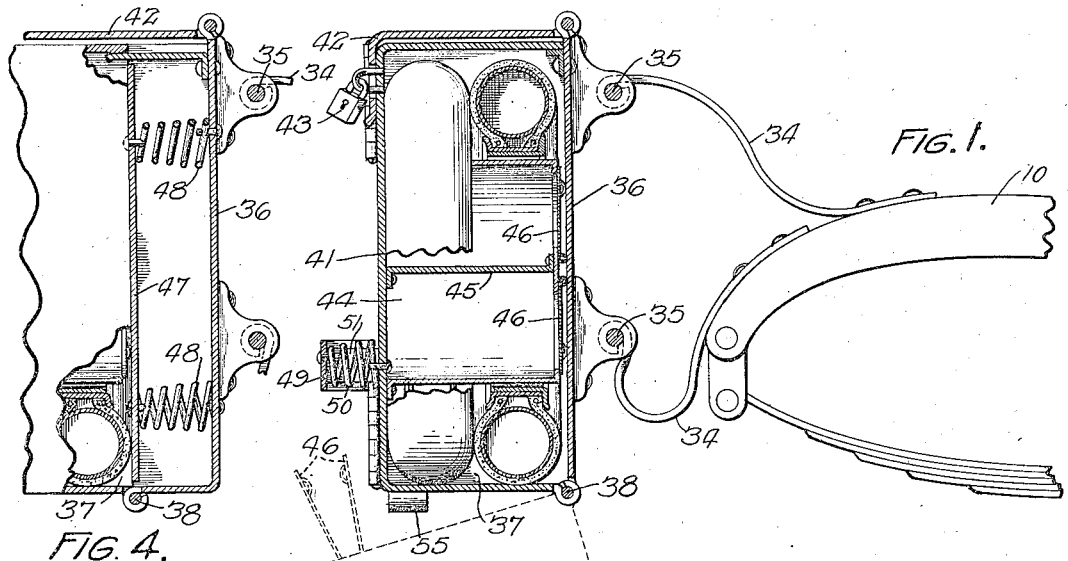
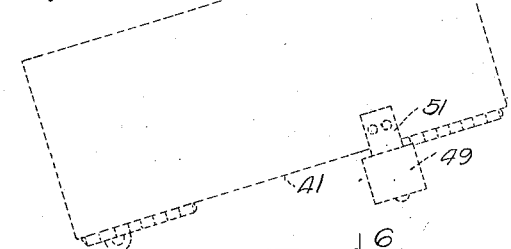
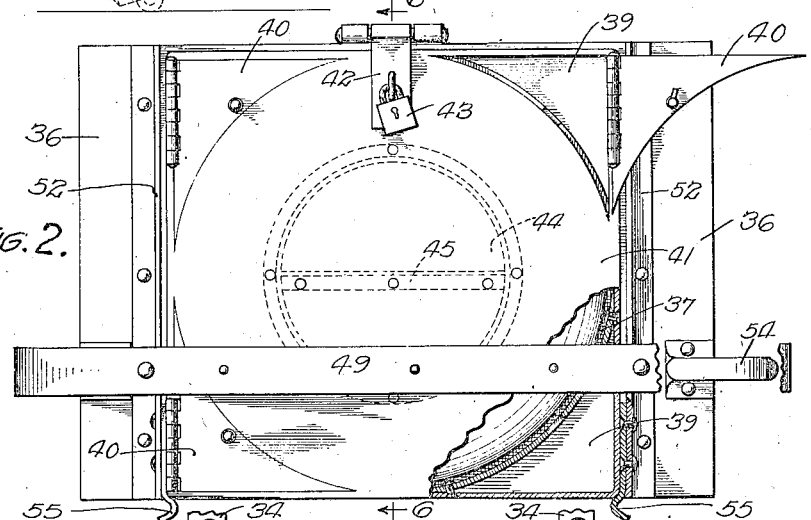
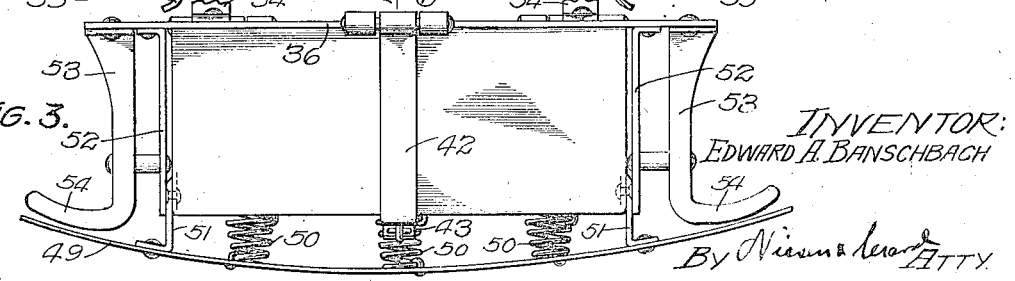
INVENTOR:
EDWARD A. BANSCHBACH Patented Nov. 5, 1929

1,734,758

UNITED STATES PATENT OFFICE

EDWARD A. BANSCHBACH, OF CHICAGO, ILLINOIS

PROTECTOR FOR AUTOMOBILES

Original application filed April 22, 1922, Serial No. 555,973. Renewed March 16, 1927. Divided and this application filed January 18, 1928. Serial No. 247,739.

This application is a division of my application, originally filed April 22, 1922, renewed March 16, 1927, Serial No. 555,973.

The invention relates to automobile accessories and has for its primary object to provide a device for protecting automobiles and other vehicles from injury by accidents and collisions.

A further object of the invention is to provide an improved means for carrying a spare tire and other devices or parts at the rear of the vehicle so that the same will be readily accessible when occasion demands.

Another object of the invention is to provide a combined spare tire carrier and rear end bumper for vehicles which shall be of improved construction and efficient in operation.

Still another important feature of the invention resides in the combination and cooperative relationship of parts making up the combined bumper and spare tire carrier and in which the structural features of the bumper part of the assembly are so constructed as to enable convenient access to be had to the spare tires carried by the carrier so that they may be removed and replaced on the carrier very conveniently and without undue manual effort.

The invention is exemplified in the combination and arrangement of parts shown in the accompanying drawing and described in the following specification, and it is more particularly pointed out in the appended claims.

In the drawings:—

Fig. 1 is a vertical sectional view showing one form of the combined bumper and spare tire carrier mounted to a vehicle frame;

Fig. 2 is a rear end view of the device illustrated in Fig. 1;

Fig. 3 is a top plan view of the device shown in Fig. 1; and

Fig. 4 is a view similar to Fig. 1 but showing a modification of the invention.

Referring now to the drawing in detail, 10 represents one of the frame members of a motor vehicle. The combined bumper and spare tire carrier is supported or mounted on these frame members 10 by brackets 34 secured to the rear ends of the frame members 10 and connected to rods 35 secured to the rear plate 36 of the tire carrier. The plate 36 has a container 37 pivoted at 38 at the lower edge of the plate 36. At the corners of the container 37 are pockets 39 having doors 40 closing openings to the pockets which extend through the front face 41 of the container. These pockets may be used for storing extra inner tubes or other articles which may be desired. A hasp 42 and lock 43 are provided for holding the container 37 in closed position. When it is desired to have access to the inside of the container it may be swung downwardly into the broken line positions shown in Fig. 1 so that the tires may be removed or replaced in the container with very little lifting.

A cylindrical compartment 44 is provided within the container 37 and occupies a space at the center of the compartment not used by the tires. If desired, this central compartment may be divided by a reinforcing plate 45 and covers 46 are provided for closing the openings to the central compartment. It will be seen that the walls of this central compartment and the reinforcing walls of the plate 45 will act as struts to prevent collapse of the cover plate 41 in case of a rear-end collision. In some cases it may be desirable to provide an additional abutment plate 47 in the rear of the container 37 provided with compression springs 48 for absorbing the force of a collision against the cover plate 41 of the tire carrier. This construction is shown in Fig. 4. For further safeguarding the construction a rear bumper bar 49 may be supported by compression springs 50 carried by the cover plate 41 of the tire carrier 37. The bumper 49 is further connected to the tire carrier 37 by bars 51 extending from the rear face of the bumper to the sides of the tire container. At opposite sides of the swinging container 37 are plates 52 extending rearwardly from the rear plate 36 and reinforced by brackets 53. The brackets 53 have their rear ends curved, as shown at 54, to form abutment stops for the bumper 49. Resilient bars 55 are bent to provide spring catches as shown in Figs. 1 and 2, to hold the container 37 in closed position.

From the above description, it will be readily seen that the bumper 49 under the influence of the springs 50 serves as a resilient impact bar for absorbing shocks of collision, protecting not only the spare tire carrier and the tires carried thereby, but also the rear end of the vehicle. The spring brackets also serve to absorb the shock of collisions or bumps and thus co-operate with the resilient impact bar 49 in this connection.

Since the bumper is pivotally or hingedly mounted to swing or drop below the spare tire carrier, the tires on the carrier are exposed so that there are no obstructions to interfere with their removal from the carrier or their replacement thereon.

Obviously those skilled in the art may make various changes in the construction and arrangement of parts without departing from the spirit and scope of the invention as defined by the claims hereto appended, and I do not wish therefore to be restricted to the precise construction herein contained.

Having thus described and shown an embodiment of my invention, what I claim and desire to secure by Letters Patent of the United States, is:—

1. The combination with a vehicle frame, of a carrying case resiliently supported by said frame in position to form a bumper for said vehicle frame.

2. The combination with a vehicle frame, of a carrying case resiliently supported by said frame, said case having front and rear walls, and strut members extending between said walls.

3. The combination with a vehicle frame, of a carrying case resiliently supported by said frame in position to form a bumper therefor, said case having spaced outer and inner walls, and a supplemental bumper carried by the outer wall of said case.

4. The combination with a vehicle frame, of a carrying case mounted thereon, said case comprising a plate secured to said frame, and a container comprising a cover member and lateral walls for spacing said cover member from said plate, said container being hinged to said plate to swing downwardly into open position.

5. The combination with a vehicle, of a carrier case mounted thereon, said case comprising a fixed upright plate, and a container for holding articles having side walls arranged to engage said plate and being hinged to said plate to swing thereon into open position.

6. The combination with a vehicle frame, of a carrier case resiliently mounted thereon, said case comprising an upright plate, and a rectangular container hinged to said plate, said container having compartments at the corners thereof to provide a substantially circular central compartment intermediate said corner compartments.

7. The combination with a vehicle frame, of a carrier case mounted thereon, said case comprising a fixed supporting plate, and a rectangular container hinged thereto, said container having a central cylindrical compartment and corner compartments spaced therefrom to provide a ring-shaped compartment for receiving circular articles.

8. The combination with a vehicle frame, of resilient brackets mounted on said frame, a carrier case supported on said brackets, said case comprising an upright plate secured to said brackets, a rectangular box pivotally mounted on the lower edge of said plate and arranged to swing downwardly into open position, a fastening means for securing said box in closed position, reinforcing members forming struts between the front and rear of said case when said box is closed and separating said box into compartments, resilient means for resisting force tending to collapse said box, and a supplemental resilient bumper for protecting said box.

9. In combination with a vehicle, of a spare tire carrier mounted on the rear end of the vehicle, and an impact bar mounted on the side of said carrier away from the vehicle, and means for swinging said bar into a lowered position when removing a tire from the carrier.

10. In a device of the class described, the combination with a casing for enclosing articles adapted to be resiliently mounted on a vehicle frame, of a cover for said casing hingedly mounted thereon to form a protecting means for the contents of said casing and for completely enclosing said contents.

11. In an article of the class described, the combination with a casing adapted to be resiliently mounted on a vehicle frame, of a cover for said casing, a bumper resiliently mounted upon said cover and extending over the edges thereof, and means attached to the sides of said casing so as to prevent undue flexing of those portions of the bumper extending over the edges of said casing.

12. A vehicle bumper adapted to normally protect articles supported on the exterior of said vehicle comprising a resiliently supported bar movably mounted so as to be moved from a position where it protects said articles and prevents their removal, to a position which permits their removal from the vehicle.

13. An automobile bumper comprising an impact bar adapted to be resiliently mounted on the frame of the vehicle and having a hinged connection therewith, said bar being normally adapted to occupy a position in which it forms a protecting means for part of said vehicle, and means for holding it in said position and preventing it from being moved about its hinged connection.

14. In a bumper for automobiles, a protecting impact bar mounted thereon, means for supporting said bar for vertical movement relatively to said automobile so that said bar can be moved from operative to inoperative position, resilient arms for mounting the bumper on the frame of a vehicle, and means for holding said bar in operative position.

15. In a device of the class described, the combination with a casing for enclosing articles, of a cover movably supported thereon and adapted to cover said casing to completely enclose said articles, and means on said cover to support a tire so that the same will move with said cover.

16. A spare tire protecting bumper comprising means for supporting said bumper on the frame of an automobile in position to protect said tire, said supporting means comprising means for moving said bumper to an inoperative position to permit the removal of said spare tire from its support.

17. An article supporting casing for vehicles comprising a member supported on said vehicle to form one side of a receptacle for completely enclosing articles, and a member movably mounted on said first member to co-operate therewith to form a complete receptacle, said last-mentioned member being movable downwardly and outwardly to a position in which the contents are readily accessible.

18. A carrier of the class described adapted to be mounted on a vehicle comprising a casing formed of a plurality of sections movable relatively to each other, and means for supporting a tire on one of said sections, said tire supporting means being displaced from normal position when one of the sections is moved relative to the other.

In testimony whereof I have signed my name to this specification on this 12th day of January, A. D. 1928.

EDWARD A. BANSCHBACH.